April 9, 1968
M. SAPOFF
3,377,554
DISSIPATION CONSTANT DETERMINING DEVICE
INCLUDING A MULTIPLIER CIRCUIT
Filed Aug. 25, 1965
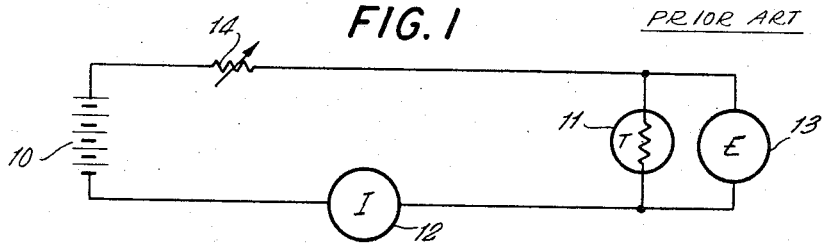
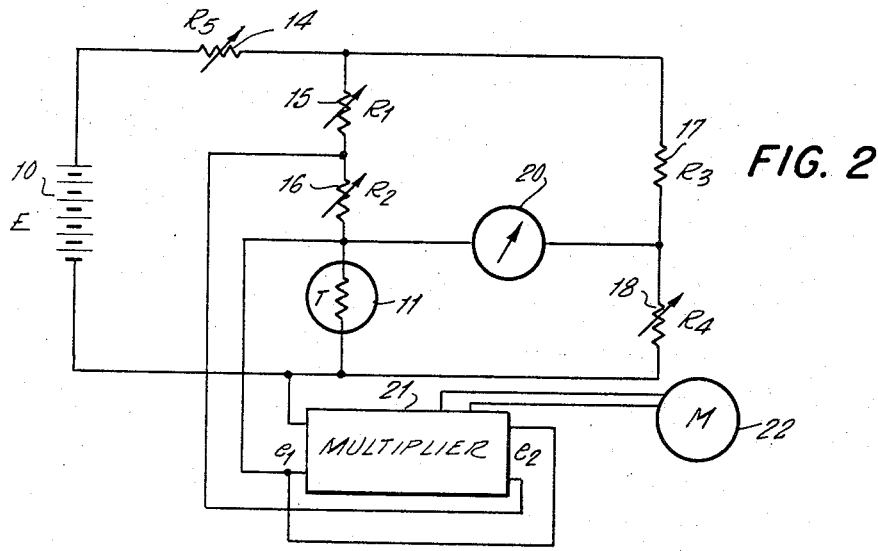
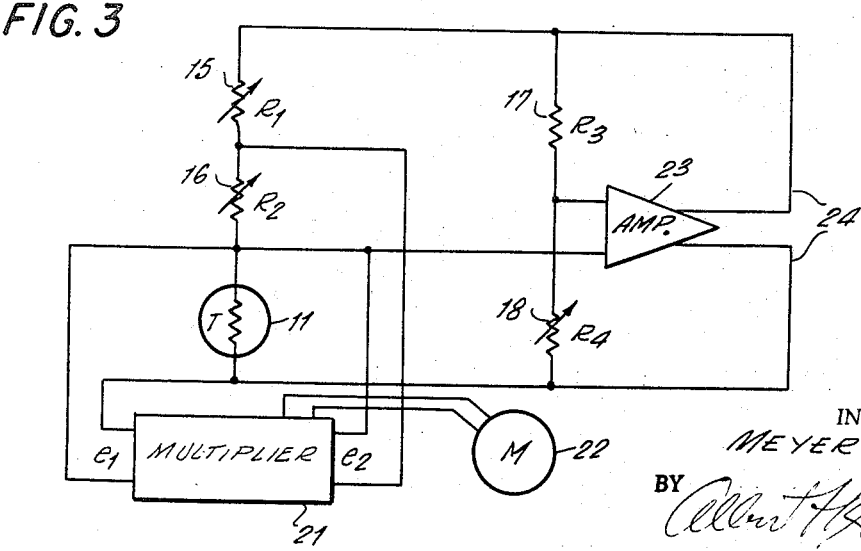
INVENTOR.
MEYER SAPOFF
BY
ATTORNEY

3,377,554
DISSIPATION CONSTANT DETERMINING DEVICE INCLUDING A MULTIPLIER CIRCUIT

Meyer Sapoff, West Orange, N.J., assignor to Victory Engineering Corporation, Springfield, N.J., a corporation of Delaware
Filed Aug. 25, 1965, Ser. No. 482,413
8 Claims. (Cl. 324—62)

This invention relates to a test circuit for determining the dissipation constant of any two-terminal electrical component. The invention has particular reference to the testing of resistive components which change their resistance when the temperature changes. The test circuit determines a parameter called the dissipation constant and is equal to the ratio of the power in watts to the rise in temperature in degrees centigrade.

Any measurement of the dissipation constant must determine the electrical power supplied to the component and its temperature above the surrounding air. The measurement must be made under fixed conditions of heat transfer to the air and other adjacent components. In the case of thermally sensitive resistors such as thermistors this measurement may be obtained by first calibrating the resistor at a specified temperature above the surrounding air and then applying current to the resistor under test, noting the current through it and the voltage drop across the resistor terminals. In order to complete the measurement it is necessary to increase the current in small increments, allowing thermal equilibrium to exist after each change of current. This process must be continued until the computed resistance ($E/I$) is equal to the calibrated value at the elevated temperature. The calibrated value of the resistance at any temperature may be determined by test within a heated enclosure and it may be computed from a knowledge of the basic characteristics of the materials used.

With these values, the dissipation constant $\delta$ (in watts per degrees centigrade) is equal to $$\delta = \frac{EI}{T - T_a}$$

where $T$ is the elevated calibration temperature and $T_a$ is the ambient temperature.

The above method of determining the dissipation constant is both time consuming and costly. The test circuit, described hereinafter, is automatic and direct. The dissipation constant may be read from a meter without resorting to any computation.

One of the objects of the present invention is to provide an improved test circuit and method which avoids one or more of the disadvantages and limitations of prior art methods.

Another object of the present invention is to measure the dissipation constant of a circuit component by the use of a circuit containing a direct reading meter.

Another object of the present invention is to shorten the time required for measuring the dissipation constant.

Another object of the present invention is to increase the accuracy of measurement of dissipation constants.

The invention consists of the construction, combination, and arrangement of parts as herein illustrated, described, and claimed.

In the accompanying drawings, forming a part hereof, is illustrated one form of embodiment of the invention, in which drawings similar reference characters designate corresponding parts, and in which:

FIGURE 1 is a schematic diagram of a prior art circuit used to measure dissipation constants.

FIGURE 2 is a schematic diagram of a circuit which measures the dissipation constant directly.

FIGURE 3 is a schematic diagram showing an alternate form of the invention in which a bridge is balanced automatically.

Referring now to the prior art circuit shown in FIGURE 1, the circuit includes a source of direct current power 10, the circuit component 11 under test, an ammeter 12, a voltmeter 13, and an adjustable series resistor 14. As outlined above, the prior art method included a number of current adjustments, noting the current and voltage drop, and computing the resistance of the component for each current setting. When the computed resistance is equal to the calibrated value, the dissipation constant may be computed by the formula given previously.

The circuit shown in FIGURE 2 includes a bridge having four arms with the thermistor or circuit component 11 connected as one of the arms. A second arm includes two adjustable resistors 15 and 16. The two opposite arms are resistors 17 and 18, and the usual current detector 20 is connected between the junctions of components 11-16 and 17-18. A direct current supply comprising a battery 10 and an adjustable resistor 14 is connected between the opposite junction points.

In order to determine the dissipation constant, two bridge adjustments must be made and, after the second, the constant is determined by obtaining the product of the voltage drop across the thermistor 11 and the voltage drop across the added resistor 16. This product may be obtained from any type of well known multiplier 21 and the result shown on a connector meter 22.

The operation of this circuit is as follows: resistors $R_1$, $R_2$, $R_3$, and $R_4$ are adjusted so that the bridge would be balanced if the dissipation of heat in the thermistor is equal to that required to raise the temperature of the thermistor to the calibration value previously selected. This setting requires a previous calibration of the thermistor as explained above. The calibration is made at an elevated temperature selected to provide a value of temperature difference ($T - T_a$) for which the dissipation constant is desired. At this setting, resistor $R_4$ is adjusted to be equal to the calibrated value of the thermistor 11 at its elevated temperature. Resistor $R_2$ is then adjusted to a value equal to the reciprocal of $T - T_a$. Resistors $R_1$ and $R_2$ are then adjusted so that their sum is equal to $R_3$. Resistor $R_5$ is next adjusted to increase the voltage supplied to the bridge until the meter 20 reads zero under equilibrium conditions. The dissipation constant is now read directly from meter 22.

The dissipation constant is equal to $$\delta = \frac{EI}{T - T_a}$$

as noted above. Meter 22 indicates the product $e_1 \times e_2$. Therefore, to arrange for meter 22 to indicate $\delta$ directly, $R_2$ must be set equal the reciprocal of the temperature difference $T - T_a$. If it is inconvenient to make $R_2$ equal to the reciprocal value, it may be adjusted for other values and a scale factor used for the multiplication or the meter reading.

The circuit shown in FIG. 3 includes the same bridge circuit as FIG. 2 and the same multiplier 21 and meter 22. However, no separate source of direct current power is necessary and the series resistor 14 is not used. Instead, a direct current amplifier 23 has its input terminals connected to the junction points between components 11-16 and 17-18, and its output terminals are connected to the opposite junction points instead of the battery 10 of FIG. 2. It is understood that the amplifier 23 includes a source of direct current power and that the output conductors are supplied with direct current which varies directly in accordance with the input voltage.

The operation of this circuit is similar to the operation of the circuit described above and shown in FIG. 2 with the exception of the introduction of the high gain amplifier 23. This amplifier automatically adjusts its output current, by means of a feed-back circuit, so that its input voltage is zero. This adjustment balances the bridge by supplying the correct current to thermistor 11 and thereby changing its resistance value until the bridge is balanced. The reading on meter 22 is now noted for the true value of the dissipation constant when a steady state reading is obtained.

Having thus fully described the invention, what is claimed as new and desired to be secured by Letters Patent of the United States is:

1. A test circuit for determining the dissipation constant of a resistor comprising; a bridge circuit having four arms including the resistor under test as one of the arms, the other three arms each including resistors; a voltage detection means connected between opposite junction points of the bridge for indicating a bridge balance condition; a source of direct current power connected to the other bridge junction points for supplying all the resistors with current; a first adjustable resistor connected in series with said source of power for providing the resistor under test with a predetermined current; a multiplier circuit for producing an output current which is proportional to the product of two input voltages; a first input connection to the multiplier circuit connected across the resistor under test and a second input connection to the multiplier circuit connected across a second adjustable resistor in an adjoining bridge arm; and an electrical indicating meter connected to an output circuit of the multiplier circuit for indicating a product proportional to the dissipation constant.

2. A test circuit as claimed in claim 1 wherein said resistor under test is a thermistor having a variable resistance as a function of its temperature.

3. A test circuit as claimed in claim 1 wherein said indicating meter is a voltmeter.

4. A test circuit as claimed in claim 1 wherein said second adjustable resistor is in series connection between the resistor under test and a third adjustable resistor, said series connected resistors connected across the source of potential and said first adjustable resistor.

5. A test circuit for determining the dissipation constant of a resistor comprising; a bridge circuit having four arms including the resistor under test as one of the arms, the other three arms each including resistors; an amplifier having its input terminals connected across opposite junction points of the bridge for amplifying the bridge unbalance voltages; said amplifier having output terminals connected to the other two junction points for providing electrical power to vary the voltage applied to the bridge and for balancing the bridge; a multiplier circuit including two product pairs of terminals for the application of voltage values to be multiplied and an output pair of terminals for delivering an output voltage to an indicating instrument; said first input pair of terminals connected across the resistor under test; said second input pair of terminals connected across a second adjustable resistor in an adjoining bridge arm; and an electrical indicating meter connected to an output circuit of the multiplier circuit for indicating a product proportional to the dissipation constant.

6. A test circuit as claimed in claim 5 wherein said resistor under test is a thermistor having a resistance which varies in accordance with the thermistor temperature.

7. A test circuit as claimed in claim 5 wherein said amplifier is a direct current amplifier and delivers a direct current voltage to said opposite bridge junction points to provide an automatic balancing of the bridge.

8. A test circuit as claimed in claim 5 wherein said second adjustable resistor has a resistance value proportional to the reciprocal of the temperature difference between a predetermined thermistor operating temperature and the ambient temperature.

References Cited

UNITED STATES PATENTS

| 2,498,103 | 2/1950 | Wojciechowski | 324—65 |
| 2,547,625 | 4/1951 | Corson | 324—62 |
| 3,148,339 | 9/1964 | Bell et al. | 330—69 |

RUDOLPH V. ROLINEC, *Primary Examiner.*

E. E. KUBASIEWICZ, *Assistant Examiner.*